United States Patent
Yi et al.

(10) Patent No.: US 9,619,462 B2
(45) Date of Patent: *Apr. 11, 2017

(54) E-BOOK READER LANGUAGE MAPPING SYSTEM AND METHOD

(71) Applicants: Young Hee Yi, San Diego, CA (US); Jung Soo Yi, San Diego, CA (US); Jung Ho Yi, San Diego, CA (US)

(72) Inventors: Young Hee Yi, San Diego, CA (US); Jung Soo Yi, San Diego, CA (US); Jung Ho Yi, San Diego, CA (US)

( * ) Notice: Subject to any disclaimer, the term of this patent is extended or adjusted under 35 U.S.C. 154(b) by 39 days.

This patent is subject to a terminal disclaimer.

(21) Appl. No.: 14/641,419

(22) Filed: Mar. 8, 2015

(65) Prior Publication Data

US 2015/0186358 A1    Jul. 2, 2015

Related U.S. Application Data

(63) Continuation of application No. 12/750,681, filed on Mar. 30, 2010, now Pat. No. 9,009,022.

(51) Int. Cl.
*G06F 17/28* (2006.01)
*G06F 17/27* (2006.01)
*G06F 15/02* (2006.01)
*G06F 3/0488* (2013.01)

(52) U.S. Cl.
CPC .......... *G06F 17/28* (2013.01); *G06F 17/2827* (2013.01); *G06F 3/04886* (2013.01); *G06F 15/0291* (2013.01)

(58) Field of Classification Search
CPC .. G06F 3/0488; G06F 17/241; G06F 17/2827; G06F 17/30; G06F 3/0482; G06F 15/0291; G06F 17/28; G06F 2203/04803; G06F 3/04886; G10L 13/043
USPC ...................................................... 704/1–10
See application file for complete search history.

(56) References Cited

U.S. PATENT DOCUMENTS

| | | | |
|---|---|---|---|
| 7,103,848 B2 | 9/2006 | Barsness et al. | |
| 7,246,118 B2 | 7/2007 | Chastain et al. | |
| 7,516,062 B2 | 4/2009 | Chen et al. | |
| 7,822,596 B2* | 10/2010 | Elgazzar | G06F 17/28 704/2 |
| 7,886,225 B2 | 2/2011 | Cope | |

(Continued)

*Primary Examiner* — Michael Ortiz Sanchez
(74) *Attorney, Agent, or Firm* — Ameh IP; Elahe Toosi; Lowell Campbell (57) ABSTRACT

A system and method operable for providing contextually triggered vocabulary information on at least one display screen of an E-book reader are disclosed. A character group comprising a target language character group is displayed on the at least one display screen. A local or a remote electronic pre-translated primary language resource is provided in response to a user selecting a word or sentence in the target language character group. The electronic pre-translated primary language electronic resource is searched to obtain a pre-translated primary language character group corresponding to the target language character group. A synchronized pre-translated primary language character group is obtained by synchronizing the pre-translated primary language words or sentences to words or sentences in the target language. The synchronized pre-translated primary language character group is displayed on the at least one display screen.

20 Claims, 8 Drawing Sheets

(56) References Cited

U.S. PATENT DOCUMENTS

| | | | |
|---|---|---|---|
| 8,126,878 | B2 | 2/2012 | Krasnow |
| 2003/0009459 | A1 | 1/2003 | Chastain et al. |
| 2003/0040899 | A1 | 2/2003 | Ogilvie |
| 2003/0115552 | A1 | 6/2003 | Jahnke et al. |
| 2005/0034056 | A1 | 2/2005 | Rubin et al. |
| 2007/0162465 | A1 | 7/2007 | Cope |
| 2007/0203688 | A1* | 8/2007 | Fuji ............... G06F 17/28 704/2 |
| 2009/0132234 | A1* | 5/2009 | Weikel ............ G06F 17/2827 704/3 |
| 2010/0094617 | A1 | 4/2010 | Okura et al. |
| 2010/0161653 | A1 | 6/2010 | Krasnow |
| 2011/0022378 | A1 | 1/2011 | Chiu et al. |
| 2011/0261030 | A1 | 10/2011 | Bullock |
| 2013/0275120 | A1* | 10/2013 | DeGross ........... G06F 17/28 704/9 |
| 2014/0222413 | A1* | 8/2014 | Rossmann ......... G06F 17/289 704/3 |

* cited by examiner

E-BOOK READER LANGUAGE MAPPING SYSTEM AND METHOD

FIELD

Embodiments of the present disclosure relate generally to display devices, and more particularly relate to E-book readers.

BACKGROUND

Students who have a native language (primary language), but studying in a second language (target language) may have many challenges such as learning a context of a book. A significantly time-consuming and painstaking challenge for such students is to learn a vocabulary that is not familiar to them. For example, a Korean student who is studying in America may be reading a textbook written in English. Generally, if the Korean student finds an unfamiliar vocabulary word or words, she/he may need to open an English-Korean dictionary to find a meaning of the unfamiliar vocabulary word in his/her primary/native language. After finding the meaning, the student may then write down a meaning of the unfamiliar vocabulary word or words on a notepad for later memorization. Similarly, a user such as a student can use translation software to learn the meaning of the unfamiliar word or words in his/her primary language. However, the translation software may not accurately translate one language to another, and may be time consuming to use.

Therefore, there is a need for systems and methods for reducing a workload of students studying in a second language.

SUMMARY

A system and method operable to provide contextually triggered vocabulary information on a display screen of an E-book reader is disclosed. The method electronically obtains an a priori translated character group by accessing a pre-translated primary language electronic resource such as an E-book pre-translated in a primary language or an E-dictionary comprising a translation from the target language to the primary language. The E-book and/or the E-dictionary is provided if a user points to or highlights a character group such as a sentence or a word on the display screen of the E-book reader. The E-book reader provides mapping of a character group in a target language to a corresponding character group in a primary/native language of the user. The E-book reader may also provide an audio pronunciation out of a pronunciation output port of the E-book reader. The user may synchronize a target language character group such as words or sentences in the target language to a pre-translated primary language character group such as words or sentences in the primary/native language from one or more corresponding E-books. Vocabulary information organization may also be provided.

In a first embodiment, a method electronically accesses an a priori translated character group using a portable electronic system comprising at least one display screen. The method displays a character group comprising a target language character group on the at least one display screen and receives a user selection of the target language character group. The method then accesses a pre-translated primary language electronic resource in response to receiving the user selection. The method also searches the pre-translated primary language electronic resource to obtain a pre-translated primary language character group corresponding to the target language character group, and synchronizes the pre-translated primary language character group to the target language character group to obtain a synchronized pre-translated primary language character group. The method then displays the synchronized pre-translated primary language character group on the at least one display screen.

In a second embodiment, a portable electronic system for language acquisition comprises at least one display screen operable to display a character group comprising a target language character group. The portable electronic system further comprises activating means to activate a user selection of the target language character group, and a pre-translated primary language electronic resource module accesses a pre-translated primary language electronic resource in response to receiving the user selection. The portable electronic system also comprises a searcher module, which searches the pre-translated primary language electronic resource to obtain a pre-translated primary language character group corresponding to the target language character group. A synchronization module synchronizes the pre-translated primary language character group to the target language character group on the at least one display screen to obtain a synchronized pre-translated primary language character group.

In a third embodiment, a computer-readable medium comprises program code for accessing an a priori translated character group using a portable electronic system comprising at least one display screen. The program code comprises code for displaying a character group comprising a target language character group on the at least one display screen, receiving a user selection of the target language character group, and accessing a pre-translated primary language electronic resource module in response to receiving the user selection. The program code further comprises code for searching the pre-translated primary language electronic resource to obtain a pre-translated language character group corresponding to the target language character group. The program code also comprises code for synchronizing the pre-translated primary language character group to the target language character group to obtain a synchronized pre-translated primary language character group. The program code also comprises code for displaying the synchronized pre-translated language character group on the at least one display screen.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Embodiments of the present disclosure are hereinafter described in conjunction with the following figures, wherein like numerals denote like elements. The figures are provided for illustration and depict exemplary embodiments of the present disclosure. The figures are provided to facilitate understanding of the present disclosure without limiting the breadth, scope, scale, or applicability of the present disclosure. The drawings are not necessarily made to scale.

DETAILED DESCRIPTION

The following description is presented to enable a person of ordinary skill in the art to make and use the embodiments of the disclosure. The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. Furthermore, there is no intention to be bound by any expressed or implied theory presented in the preceding technical field, background, brief summary or the following detailed description. The present disclosure should be accorded scope consistent with the claims, and not limited to the examples described and shown herein.

Embodiments of the disclosure are described herein in the context of one practical non-limiting application, namely, an E-book reader. Embodiments of the disclosure, however, are not limited to such E-book reader applications described herein, and the embodiments may also be utilized in other applications. For example, embodiments may be applicable to cellular phones, ipods, ipads, tablet personal computers, mobile entertainment devices, E-textbooks, and the like.

As would be apparent to one of ordinary skill in the art after reading this description, these are merely examples and the embodiments of the disclosure are not limited to operating in accordance with these examples. Other embodiments may be utilized and structural changes may be made without departing from the scope of the exemplary embodiments of the present disclosure.

Figure 1:
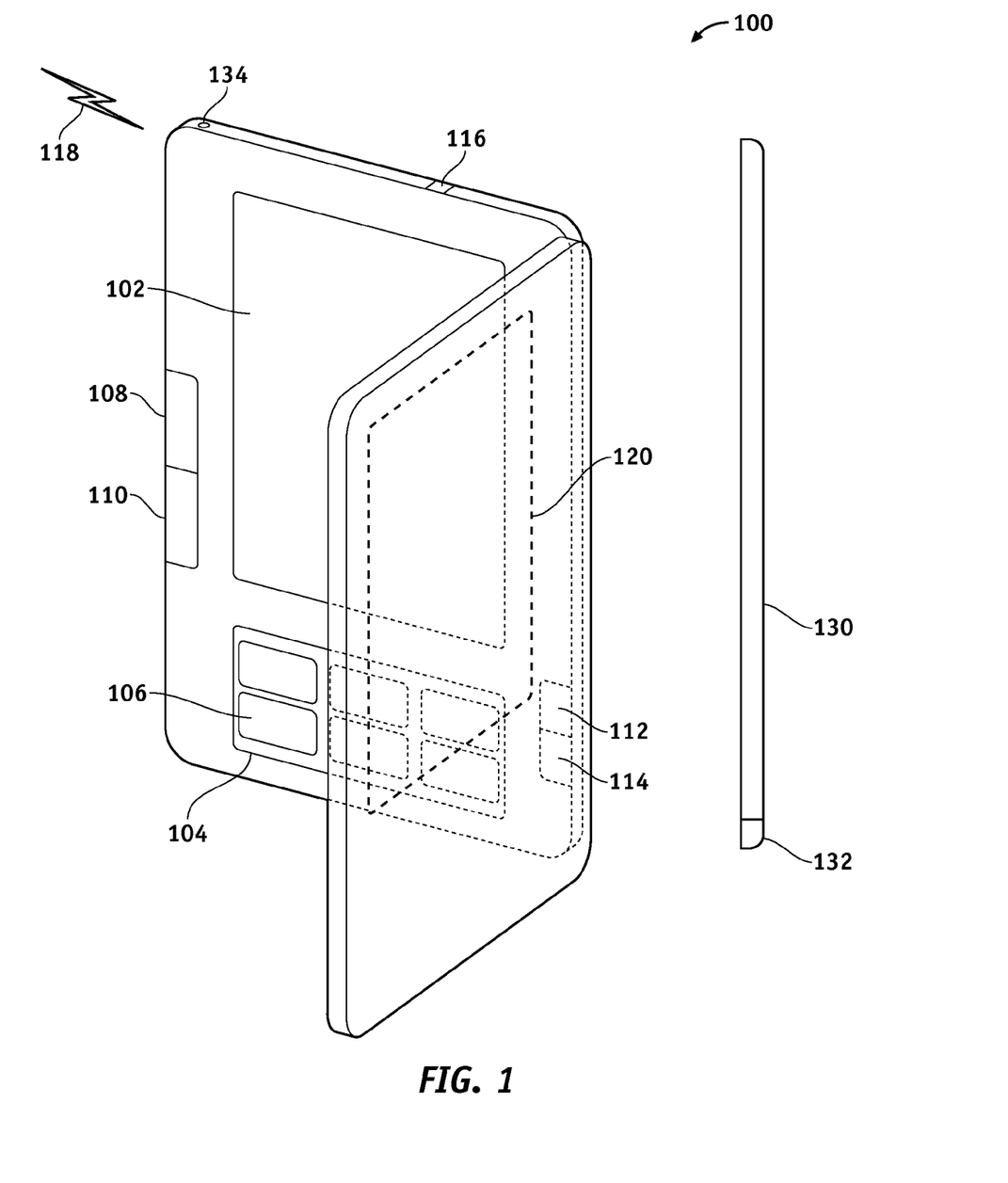
FIG. 1 is an illustration of an E-book reader according to an embodiment of the disclosure.

FIG. 1 is an illustration of an E-book reader 100 according an embodiment of the disclosure. The E-book reader 100 may comprise a display screen 102 and/or a display screen 120, a key pad 104, a plurality of control keys 108-114, and an antenna 134.

Figure 2:
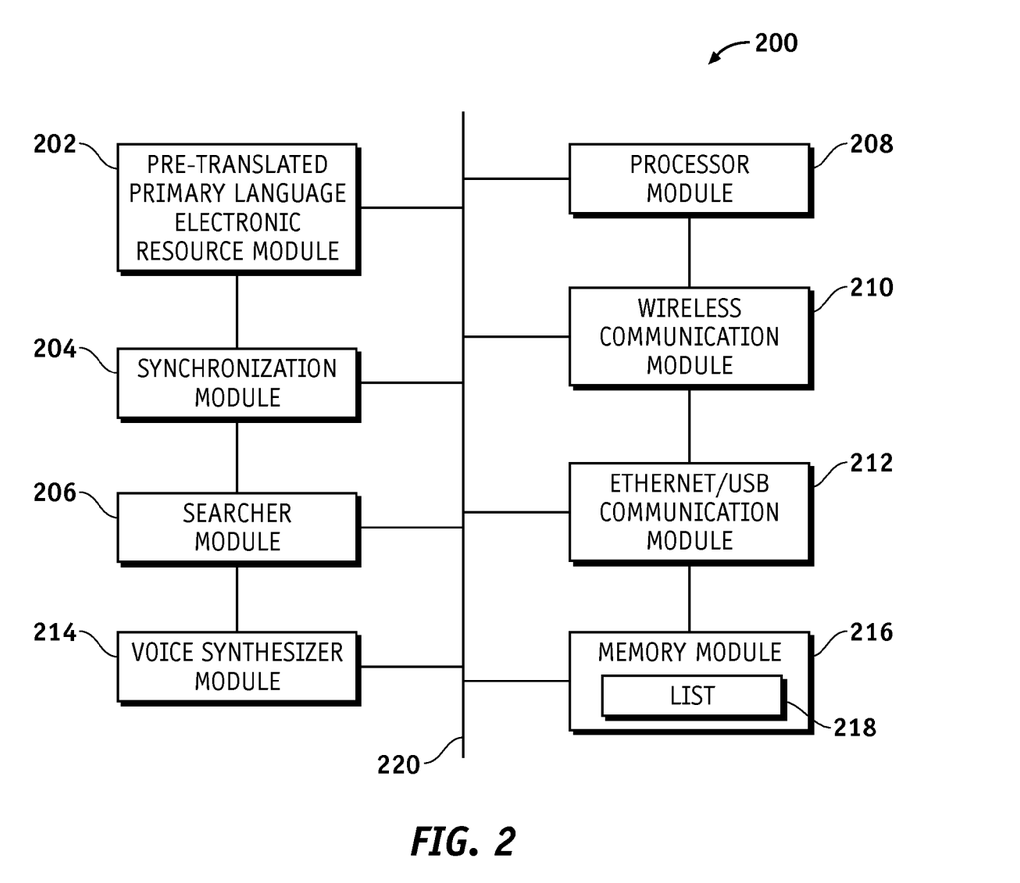
FIG. 2 is an illustration of a functional block diagram of an E-book reader system according to an embodiment of disclosure.

The display screen 102/120 may use a technology such as, for example but without limitation, a liquid crystal display (LCD), an organic electro-luminescence (OEL), an organic light emitting diode (OLED), an organic electro luminescent device (OELD), an electronic ink, and the like. Various kinds of information can be displayed on the display screen 102/120 via an image/video signal supplied from a processor module 208 (FIG. 2). For example, a pre-translated primary language character group may be displayed on the display screen 102/120 as explained below. In this document, the primary language refers to the user's native language and any other language that the user may be familiar with or uses for language acquisition via language mapping.

The key pad 104 comprises a plurality of keys 106, such as but without limitation, a power key, numeric keys, character keys, arrow keys, direction keys, a determination key, a transmission key, and the like. Various functions can be allocated to the keys 106.

The E-book reader 100 may be controlled and/or manipulated via, for example but without limitation, a touch function (not shown) on the display screen 102/120, the keys 106 on the key pad 104, the control keys 108-114, a tip 132 of a stylus 130, and the like.

The E-book reader 100 may wirelessly communicate with a base station (not shown) or an access point transceiver (not shown) via a wireless data communication link 118. As explained below, the E-book reader 100 may wirelessly communicate through a suitably configured RF antenna arrangement such as the antenna 134. The antenna 134 can support a wireless communication protocol and modulation scheme, such as but without limitation, Wi-Fi, cellular, and the like. The E-book reader 100 may also communicate with the Internet via an access port 116 coupled to a local area network (not shown) such as an Ethernet.

The antenna 134 may be, for example but without limitation, a built-in antenna, a rod antenna, and the like. The antenna 134 is configured to transmit and receive electromagnetic waves such as, for example but without limitation, a predetermined frequency band to and from the base station respectively.

FIG. 2 is an illustration of a functional block diagram of an E-book reader system 200 (E-book reader 200) according to an embodiment of disclosure. The E-book reader 200 may comprise, for example but without limitation, a pre-translated primary language electronic resource module 202, a synchronization module 204, a searcher module 206, a processor module 208, a wireless communication module 210, an Ethernet/USB communication module 212, a voice synthesizer module 214, and a memory module 216 comprising a list/database 218. Modules 202/204/206/208/210/212/214/216 may communicate via a communication link 220.

The pre-translated primary language electronic resource module 202 provides access to a pre-translated primary language electronic resource comprising the pre-translated primary language character group. The pre-translated primary language electronic resource may comprise, for example but without limitation, a locally stored dictionary module (E-dictionary) comprising translation from the target language to the primary language, a remotely accessible E-dictionary, a locally stored pre-translated version of a particular E-book translated from the target language to the primary language (pre-translated primary language E-book), a remotely accessible pre-translated primary language E-book, an interactive on-line Internet cloud-computing translation service, and the like. The E-dictionary may comprise, for example but without limitation, a collection of words in one or more specific languages, with usage information, definitions, etymologies, phonetics, pronunciations, syllabications, meanings, synonyms, and the like. The E-dictionary may further comprise a lexicon of words in one language with equivalents of the lexicon of words in another language. The pre-translated primary language E-book may comprise a collection of words and sentences in one or more specific languages arranged in various chapters, sections, etc. The E-dictionary and the pre-translated primary language E-book can be stored in the memory module 216 to be accessed by the pre-translated primary language electronic resource module 202 on-demand by the user. However, if a particular vocabulary is not available in the E-dictionary on the memory module 216, the E-book reader 100/200 can resort to accessing an interactive on-line Internet dictionary service via, for example, the wireless communication module 210 and/or the Ethernet/USB communication module 212. Similarly, the E-Book reader 100/200 can access a predefined interactive on-line Internet translation service, if the pre-translated primary language E-book is not available or the pre-translated primary language E-book is not stored on the memory module 216.

The synchronization module 204 is operable to synchronize at least one character group in a primary language of the user with the at least one pre-translated group in the target language as explained in more detail in the context of discussion of FIGS. 5 and 8 below. The synchronization module 204 may perform a function to coordinate events to operate translation functions such as the voice synthesizer module 214 substantially coordinated with a text view on the display screen 102. In some embodiments, relative alignment between viewed text in the primary language and viewed text in the target language is coordinated automatically by the synchronization module 204 or manually as described below.

The searcher module 206 is operable to electronically search the pre-translated primary language electronic resource to obtain a pre-translated primary language character group corresponding to the target language character group. For example, the searcher module 206 estimates a location of a corresponding sentence in the pre-translated primary language E-book comprising the pre-translated primary language character group. The estimate may be based on a location of a highlighted sentence in the target language E-book comprising the target language character group as explained in more detail below in the context of discussion of FIGS. 5 and 8.

The processor module 208 may provide transmission/reception of signals at the wireless communication module 210. The processor module 208 can control overall operation of the E-book reader 200. For example, the processor module 208 may control operations of the E-book reader 200 so that processes of the E-book reader 200 are suitably performed. Processes of the E-book reader 200 may be suitably performed such that various processes are performed by proper procedures in response to an input from a user. These processes may comprise, for example but without limitation, highlighting/selecting a sentence, character input by the manipulation of the keys 106 on the key board 104 and the like. The processor module 208 may also control a communication of the wireless communication module 210, and access to the memory module 216 for accessing the target language E-book. The processor module 208 may also control access to the memory module 216 and/or the pre-translated primary language electronic resource module 202 to access the pre-translated primary language E-book and/or the E-dictionary. Further, the processor module 208 may control access to language mapping results stored in the list 218, display of the pre-translated primary language character group and the target language character group on the display screen 102/120 (FIG. 1), voice processing of the voice synthesizer module 214, and the like. For example, the processor module 208 may control the wireless communication module 210 to receive the pre-translated primary language E-book from an on-line source such as the Internet.

For another example, the processor module 208 may control the display screen 102/120 to display sentences in the target language and in the primary language when synchronizing same via the synchronization module 204.

The processor module 208 may comprise a computer (microprocessor) or another processor for performing a process based on a program (operating system, application program, etc.) stored in the memory module 216. The processor module 208 may read instruction code sequentially from programs such as the operating system and the application program which are stored in the memory module 216, and perform the programs. For example, the voice synthesizer module 214 in the processor module 208 may be realized on the computer by one or a plurality of programs, or may be at least partially realized by hardware.

The wireless communication module 210 is operable to transmit and receive a plurality of communication signals comprising data signals via a transceiver (not shown). The wireless communication module 210 operates with the antenna 134 to carry out a radio communication with a network side device via a base station communicatively coupled to a wireless communication network (not shown). The transceiver communicates with a base station transceiver via the wireless data communication link 118 as explained above. The transceiver cooperates with the base station transceiver with a suitably configured RF antenna arrangement such as the antenna 134 that can support a particular wireless communication protocol and modulation scheme as explained above. The data signals may comprise, for example but without limitation, text data, and web data during accessing a web site. Data obtained from the data signals may be displayed on the display screen 102/120 for displaying for example, the pre-translated primary language character group, the target language character group, and the like.

The wireless communication module 210 can transmit a signal from the processor module 208 as a transmitted radio signal to the base station through the antenna 134, and can demodulate a received radio signal received from the base station through the antenna 134. The processor module 208 receives the demodulated signal form the wireless communication module 210.

The Ethernet/USB communication module 212 is operable to provide communication between the E-book reader 200 and the pre-translated primary language electronic resource via Ethernet. The Ethernet/USB communication module 212 communicates with the Internet through the access port 116 to download E-books, E-dictionaries, and to interact with Web-based dictionary services and on line translation services.

The voice synthesizer module 214 artificially produces human speech, and may be implemented in software or hardware. A text-to-speech (TTS) system may be used to convert normal language text into speech, and a phonetics system may be used to render symbolic linguistic representations like phonetic transcriptions into speech. Synthesized speech can be created, for example but without limitation, by concatenating pieces of recorded speech that are stored in a database. A size of the stored speech units of the voice synthesizer module 214 may vary. For example, a system that stores phones (i.e., in phonetics, a phone may be a speech sound or gesture considered a physical event without regard to its place in the phonology of a language) or diphones (i.e., in phonetics, a diphone may be an adjacent pair of phones) provides the largest output range, but may lack clarity. For specific usage domains, the storage of entire words or sentences can provide high-quality output. Alternatively, the voice synthesizer module 214 may incorporate a model of the vocal tract and other human voice characteristics to create a completely "synthetic" voice output. The voice synthesizer module 214 can provide an audio pronunciation of, for example but without limitation, the pre-translated primary language character group (i.e., sentences, words), the target language character group, and the like, out of the pronunciation output port (not shown) of the E-book reader 100/200.

The memory module 216 comprises the database/list 218. The memory module 216 is operable to store various kinds of data (such as but without limitation language acquisition data) used for various processes of the E-book reader 100/200. In practical embodiments, the memory module 216 may comprise, for example but without limitation, a non-volatile storage device (non-volatile semiconductor memory, hard disk device, optical disk device, and the like), a random access storage device (for example, SRAM, DRAM), or any other form of storage medium known in the art. For example, the memory module 216 may store, the pre-translated primary language character group, the pre-translated primary language E-book, the target language character group, the target language E-book, various words and sentences in the list 218 for on-demand retrieval by the user, a computer program which is executed by the processor module 208, an operating system, an application program, output result of the processor module 208, tentative data used in executing a program processing, and the like. The memory module 216 may be coupled to the processor module 208 such that the processor module 208 can read information from and write information to the memory module 216. As an example, the processor module 208 and the memory module 216 may reside in their respective ASICs. The memory module 216 may also be integrated into the processor module 208. In an embodiment, the memory module 216 may comprise a cache memory for storing temporary variables or other intermediate information during execution of instructions to be executed by the processor module 208. The memory module 216 may use the non-volatile storage device for storing instructions to be executed by the processor module 208.

Figure 3:
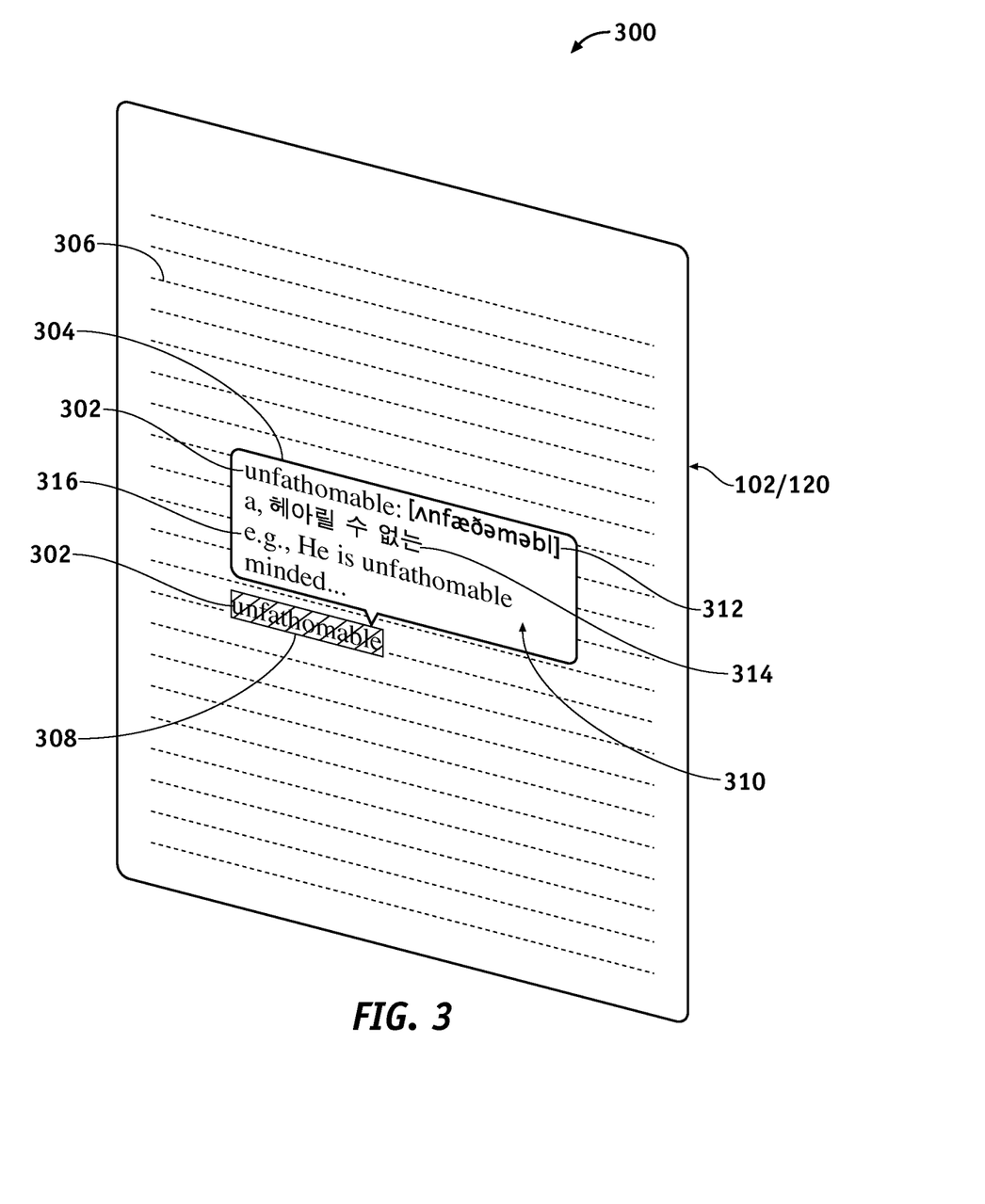
FIG. 3 is an illustration of exemplary highlighted vocabulary words shown in a bubble according to an embodiment of the disclosure.

FIG. 3 is an illustration of an exemplary highlighted target language character group 300 such as vocabulary words 302 showing a bubble 304 according to an embodiment of the disclosure. The E-book reader 100/200 displays the pre-translated primary language character group in the bubble 304 presented on the display screen 102/120, in response to a selection by a user. For example, the user may indicate or select the vocabulary words 302 from text 306 on the display screen 102/120. The user may indicate or select the vocabulary words 302 by, for example but without limitation, pointing to the vocabulary words 302 on the display screen 102/120 with an on screen pointer, touching the display screen 102/120 to point to the vocabulary words 302, highlighting the vocabulary words 302 on the display screen 102/120, and the like. The highlighting may be done by touching a character of the interest such as the vocabulary words 302 with the tip 132 of the stylus 130 (FIG. 1). As mentioned above, the searcher module 206 obtains the pre-translated primary language character group corresponding to the vocabulary words 302 in response to the selection by the user, by accessing the pre-translated primary language electronic resource. For example, as shown in the FIG. 3, the vocabulary words 302 may comprise an English word "unfathomable" 302 indicated by a highlight 308. The bubble 304 appears on the display screen 102/120 in response to the highlight 308 indicating the English word "unfathomable" 302 in this example. Contents 310 of the bubble 304 may comprise, for example but without limitation, a phonetic pronunciation: "ʌnfˈæðəməbəl" 312, the pre-translated primary language character group such as a Korean translation "헤아린 수 없는" 314, an example of a usage "e.g., He is unfathomable . . . " 316, the vocabulary the English word "unfathomable" 302, and the like. The E-book reader 100/200 may also provide an audio pronunciation, using the voice synthesizer module 214 of the E-book reader 100/200, in response to the user highlighting the phonetic pronunciation "ʌnfˈæðəməbəl" 312. The E-book reader 100/200 may store and organize the language mapping results such as the contents 310 of the bubble 304 mentioned above in the list 218 in the memory module 216 for subsequent usage by the user as explained in more detail below.

Figure 4:
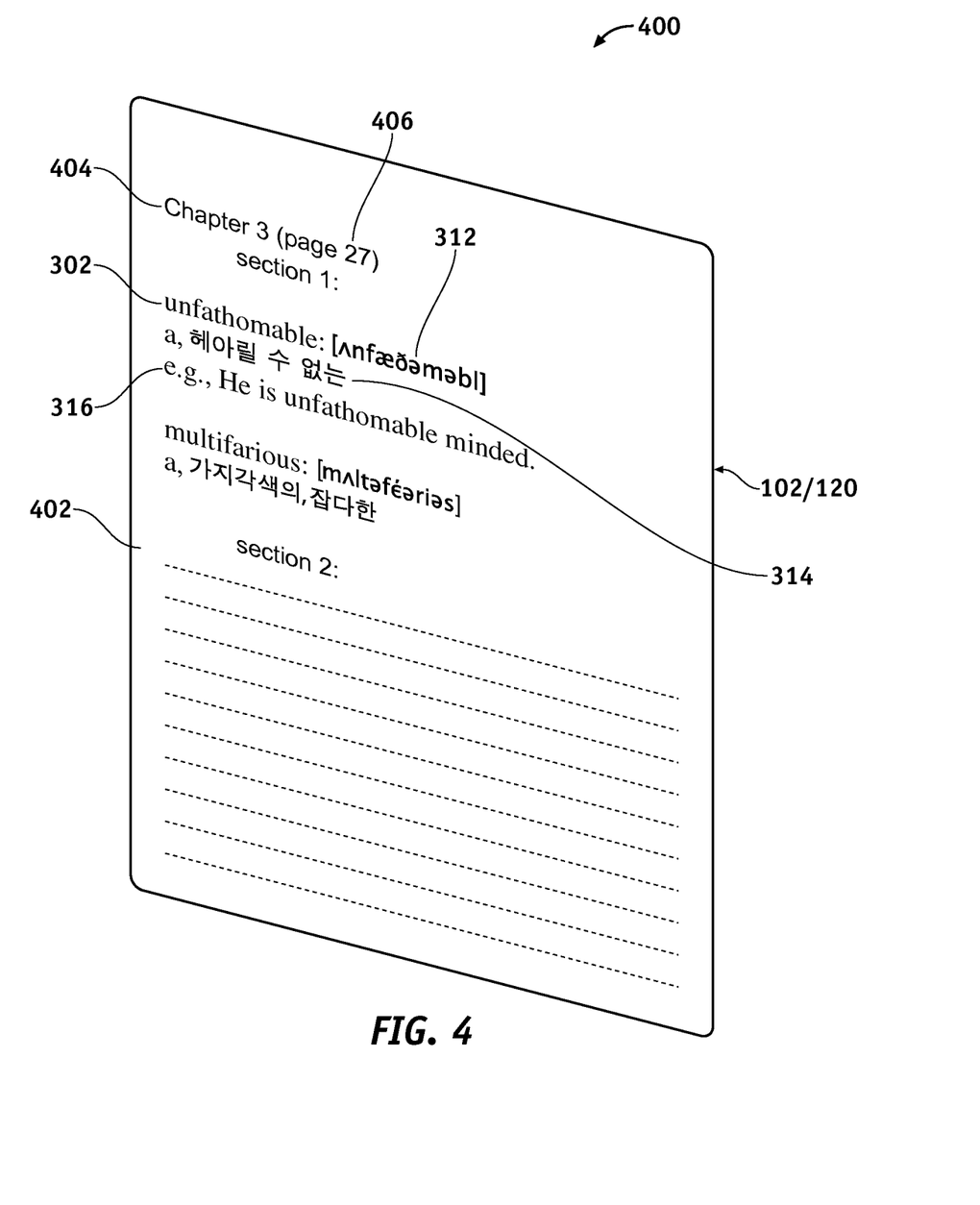
FIG. 4 is an illustration of an exemplary list comprising vocabulary words previously referred to by a user according to an embodiment of the disclosure.

FIG. 4 is an illustration of an exemplary list 400 (list 218 in FIG. 2) comprising a target language character group such as the vocabulary words 302 previously referred to by the user according to an embodiment of the disclosure. If the user wants to review the vocabulary words 302 previously referred to by him/her while reading a particular E-book, the E-book reader 100/200 provides the list 400 of, for example but without limitation, the vocabulary words 302, the Korean translation "헤아릴 수 없는" 314, the example of the usage "e.g., He is unfathomable . . . " 316, and the like, that are organized in section 1 of the list 400 and stored in the memory module 216. Similarly, other vocabulary information 402 can be organized in section 2 of the list 400 and stored in the memory module 216. The list 400 may be organized according to a user preference, such as but without limitation, by a chapter 404, by a page 406, and the like. In this manner, the user can use the list 400 to, for example but without limitation, memorize the vocabulary words 302 without opening up a paper printed dictionary and taking notes, and the like. The list 400 of the vocabulary words 302 may be printed out to a printer through a printer output port (not shown), such as but without limitation, a USB output port, a wireless communication interface, and the like. The vocabulary words 302 may be displayed, for example but without limitation, on the display screen 102 or the display screen 120.

Figure 5:
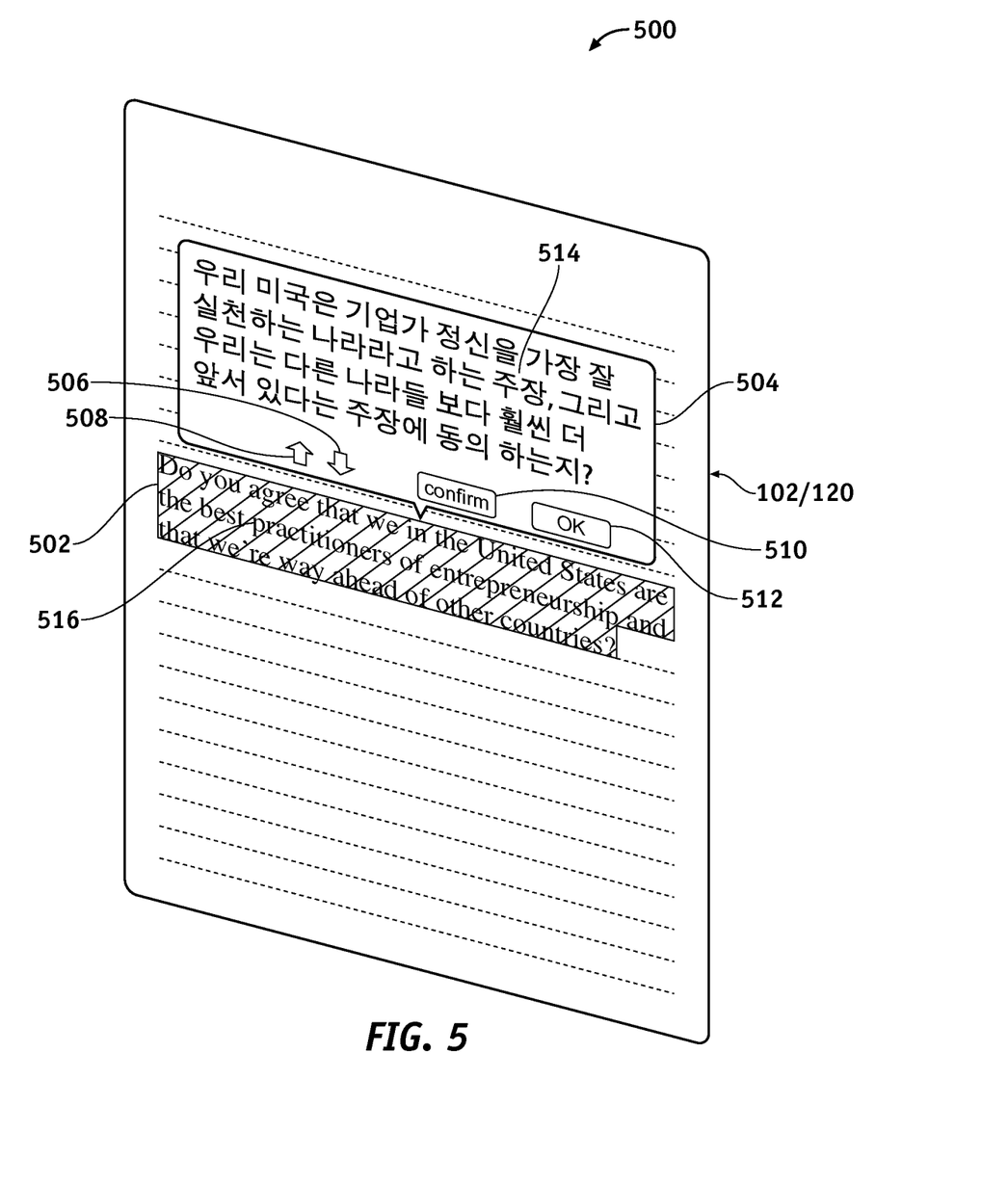
FIG. 5 is an illustration of an exemplary highlighted sentence presented in a bubble according to an embodiment of the disclosure.

FIG. 5 is an illustration of an exemplary highlighted target language character group 500, such as a target language sentence 516 highlighted by a highlight 502 according to an embodiment of the disclosure. The target language sentence 516 may be synchronized to a pre-translated primary language character group such as a pre-translated primary language sentence 514 presented in a bubble 504. As mentioned above, understanding and learning vocabulary words and contexts in the target language (second language) that are not familiar to a user, such as a foreign student or a foreign national, can be a time-consuming process and can annoy the user by breaking a rhythm of a reading process. Furthermore, there are many books that are translated to many different languages. The user may want to read a particular E-book in one language such as a target language, and from time-to-time refer to a translation of the particular E-book in his/her primary language to clarify a context. For example, as mentioned above, both the primary language version (pre-translated primary language E-book) and the target language version (target language E-book) of the E-books can be stored in the memory module 216 of the E-book reader 100/200. Then the user can highlight the target language sentence 516 in the target language E-book to access the pre-translated primary language sentence 514 in the pre-translated primary language E-book presented in the bubble 504. The bubble 504 may be presented for example, above the highlight 502. The user can save the pre-translated primary language sentence 514 in the list 218 for later retrieval to improve his/her language skills.

If the user activates/tabs to an unfamiliar sentence that is not well understood by her/him, the E-book reader 100/200 accesses the pre-translated primary language sentence 514 by accessing the pre-translated primary language electronic resource as mentioned above in the context of discussion of FIG. 2. For example, if the E-book had already been translated to the user's primary language, then the primary language E-book can be downloaded to the memory module 216 and the pre-translated primary language electronic resource module 202 can retrieve the pre-translated primary language sentence 514 from the memory module 216. If the user highlights the target language sentence 516 shown in the highlight 502, in response the searcher module 206 electronically searches the pre-translated primary language electronic resource module 202 to obtain the primary language sentence 514. In this manner, the searcher module 206 estimates a location of the pre-translated primary language sentence 514 based on, for example but without limitation, a calculation of a chapter location, section location, position of the particular highlighted sentence and/or previous synchronization position, and the like. However, a one-to-one mapping of the pre-translated primary language E-book and the target language E-book may not be available in the pre-translated primary language electronic resource accessible by the pre-translated primary language electronic resource module 202. For example, in some pre-translated primary language E-books, a sentence or a chapter can be added or subtracted. The user can control movement of the pre-translated primary language sentence 514 in the pre-translated primary language E-book using a scroll up synchronization button 506 and a scroll down synchronization button 508. If the pre-translated primary language sentence 514 is synchronized to the target language sentence 516, then a confirm button 510 can be activated for storing the pre-translated primary language sentence 514 and/or to the target language sentence 516 in the list/data base 218 for further use. The user can press or activate an "OK" button 512 to erase the pre-translated primary language sentence 514 from the display screen 102/120 and may move on to read a next sentence in the text 306 of, for example but without limitation, the pre-translated primary language E-book. For example but without limitation, the target language sentence 516 highlighted by the highlight 502 may comprise "Do you agree that we in the United States are the best practitioners of entrepreneurship, and that we're way ahead of the other countries?", and the bubble 504 may comprise a primary Korean translation " 우리 미국은 기업가 정신을 가장 잘 실천하는 나라 라고 하는 주장, 그리고 우리는 다른 나라들 보 다 훨씬 더 앞서 있다는 주장에 동의 하는 지 ?". In this manner, while reading, the user can interactively and conveniently access the pre-translated primary language E-book already downloaded to the memory module 216. The pre-translated primary language sentence 514 can be displayed on the same display screen 102/120 in the bubble 504 or can be displayed on the display screen 120.

Figure 6:
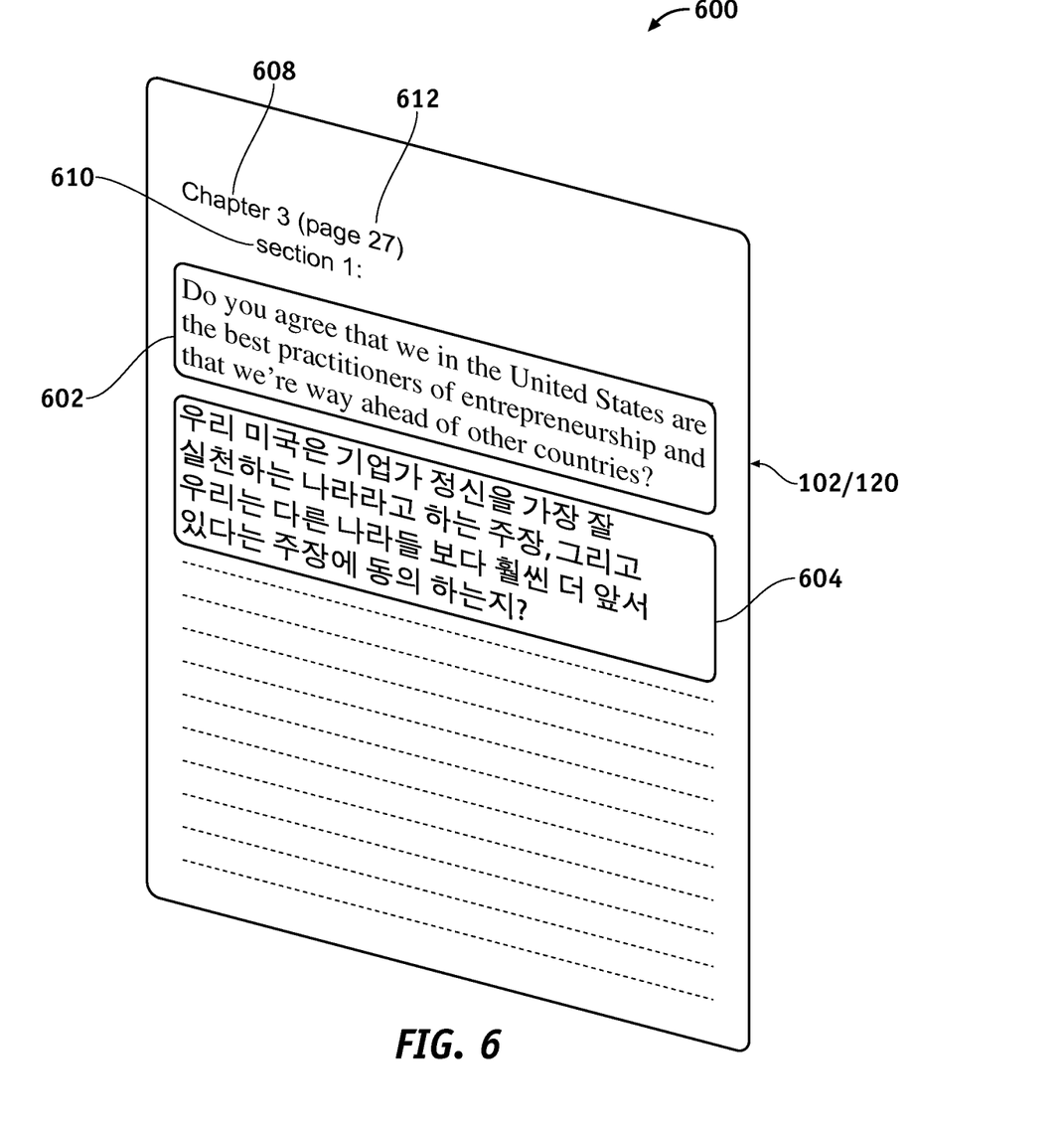
FIG. 6 is an illustration of an exemplary list of highlighted sentences according to an embodiment of the disclosure.

FIG. 6 is an illustration of an exemplary list 600 (218 in FIG. 2, 400 in FIG. 4) of the highlighted sentences 602/604 according to an embodiment of the disclosure. During or after reading, the user can output the list 600 on the display screen 102/120 or to a printed paper for, for example but without limitation, memorization, and the like. The list 600 may comprise, for example but without limitation, the highlighted sentences 602/604, paragraphs, numbers, symbols, ideograms, logograms, and the like. The list 600 may also comprise a location of the highlighted sentences 602/604 in a corresponding E-book, such as but without limitation, a chapter number 608, a section number 610, a page number 612, and the like.

Figure 7:
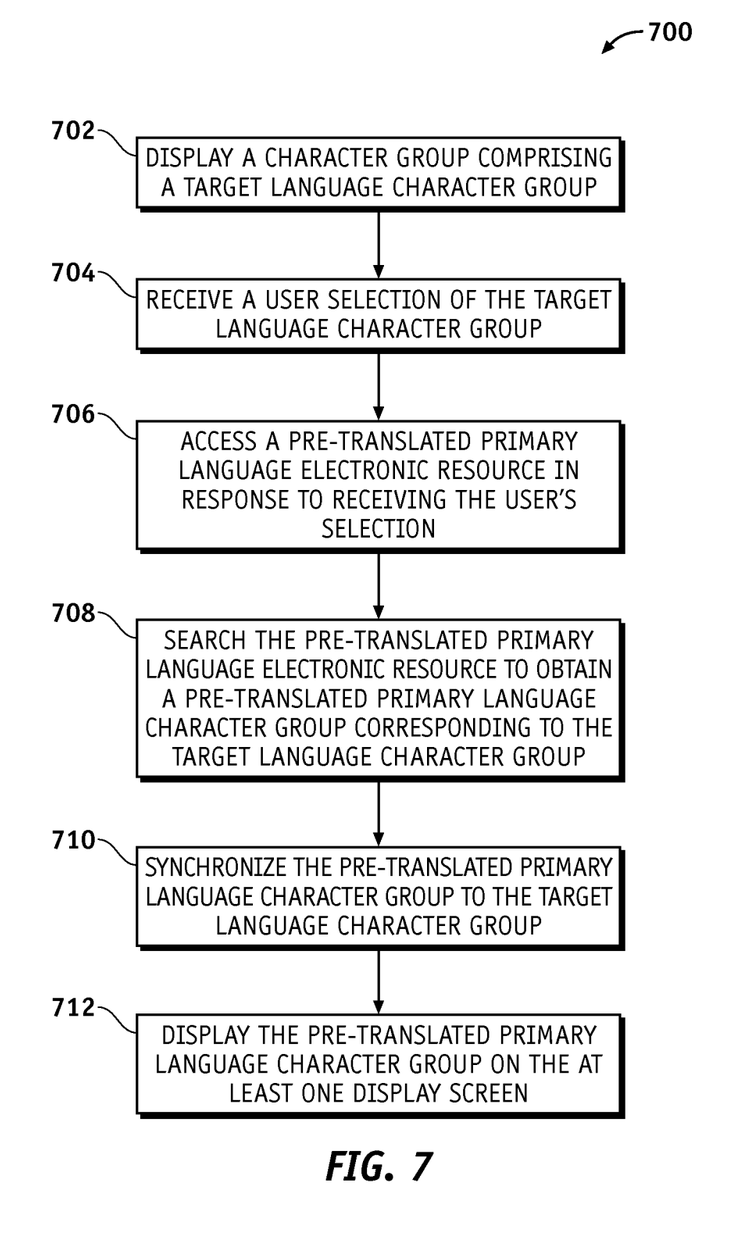
FIG. 7 is an illustration of a flowchart showing an exemplary process for electronically accessing an a priori translated character group using an E-book reader according to an embodiment of the disclosure.

FIG. 7 is an illustration of a flowchart showing an exemplary process 700 for electronically accessing an a priori translated character group using the E-book reader 100/200 according to an embodiment of the disclosure. The various tasks performed in connection with process 700 may be performed by software, hardware, firmware, a computer-readable medium having computer executable instructions for performing the process method, or any combination thereof. The process 700 may be recorded in a computer-readable medium such as a semiconductor memory, a magnetic disk, an optical disk, and the like, and can be accessed and executed, for example, by a computer CPU in which the computer-readable medium is stored. It should be appreciated that process 700 may include any number of additional or alternative tasks, the tasks shown in FIG. 7 need not be performed in the illustrated order, and process 700 may be incorporated into a more comprehensive procedure or process having additional functionality not described in detail herein. For illustrative purposes, the following description of process 700 may refer to elements mentioned above in connection with FIGS. 1-2. In practical embodiments, portions of process 700 may be performed by different elements of the E-book reader 100/200 for language acquisition via mapping form one language to another, e.g., the display screen 102/120 or multiple display screens, the pre-translated primary language electronic resource module 202, the synchronization module 204, the processor module 208, the wireless communication module 210, the voice synthesizer module 214, the memory module 216, the Ethernet/USB communication module 212, and the like. Process 700 may have functions, material, and structures that are similar to the embodiments shown in FIGS. 1-6. Therefore common features, functions, and elements may not be redundantly described here.

Process 700 may begin by displaying a character group comprising a target language character group on the display screen 102/120 (task 702).

Process 700 may continue by receiving a user selection of the target language character group (task 704).

Process 700 may continue by accessing a pre-translated primary language electronic resource via the pre-translated primary language electronic resource module 202, in response to receiving the user selection (task 706).

Process 700 may continue by searching the pre-translated primary language electronic resource using the searcher module 206 to obtain a pre-translated primary language character group corresponding to the target language character group (task 708).

Process 700 may continue by synchronizing the pre-translated primary language character group to the target language character group using the synchronization module 204 to obtain a synchronized pre-translated primary language character group (task 710).

Process 700 may continue by displaying the synchronized pre-translated primary language character group on the display screen 102/120 (task 712).

Figure 8:
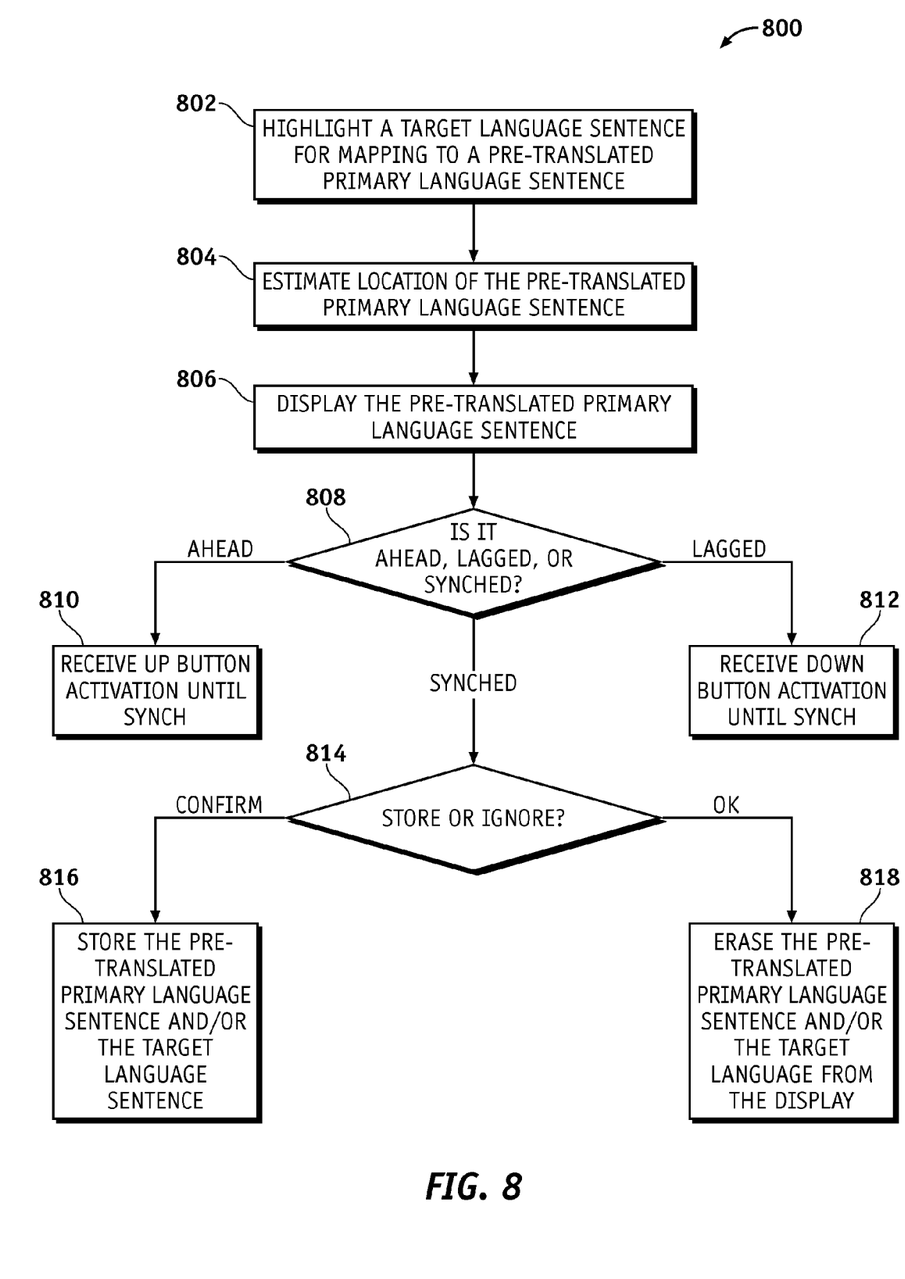
FIG. 8 is an illustration of a flowchart showing a synchronization process for synchronizing a target language character group to a primary language character group according to an embodiment of the disclosure.

FIG. 8 is an illustration of a flowchart showing a synchronization process for synchronizing a target language character group with a native language character group according to an embodiment of the disclosure. The various tasks performed in connection with processes 800 may be performed by software, hardware, firmware, a computer-readable medium having computer executable instructions for performing the process method, or any combination thereof. The process 800 may be recorded in a computer-readable medium such as a semiconductor memory, a magnetic disk, an optical disk, and the like, and can be accessed and executed, for example, by a computer CPU in which the computer-readable medium is stored. It should be appreciated that process 800 may include any number of additional or alternative tasks, the tasks shown in FIG. 8 need not be performed in the illustrated order, and process 800 may be incorporated into a more comprehensive procedure or process having additional functionality not described in detail herein. For illustrative purposes, the following description of process 800 may refer to elements mentioned above in connection with FIGS. 1-6. In practical embodiments, portions of process 800 may be performed by different elements of the E-book reader 100/200 for mapping form one language to another, e.g., the display screen 102 and/or 120, the pre-translated primary language electronic resource module 202, the synchronization module 204, the voice synthesizer module 214, the processor module 208, the wireless communication module 210, the memory module 216, the Ethernet/USB communication module 212, and the like. Process 800 may have functions, material, and structures that are similar to the embodiments shown in FIGS. 1-7. Therefore common features, functions, and elements may not be redundantly described here.

The process 800 may begin by a user selecting (e.g., but without limitation, by highlighting) a target language character group such as a target language sentence 516 (FIG. 5) in the target language for mapping to the pre-translated primary language character group such the pre-translated primary language sentence 514 (FIG. 5) (task 802). In this manner, process 800 accesses to the pre-translated primary language electronic resource module 202 to obtain a pre-translated primary language resource such as the pre-translated primary language E-book, and the like, as explained above.

The process 800 may then continue by the searcher module 206 estimating a location of the pre-translated primary language character group such as the pre-translated primary language sentence 514 in the pre-translated primary language E-book (task 804). The searcher module 206 estimates the location based on a location of the target language sentence 516 (highlighted sentence 516) in the target language E-book. In this manner, the searcher module 206 estimates a location of a corresponding pre-translated primary language sentence 514 using parameters, such as but without limitation, the chapter number 608, a section number 610, a number of starting sentences prior to highlighting a particular sentence (not shown), a previously highlighted sentence synchronization position (not shown), and the like. For example, if both the target language E-book and the primary language E-book are subdivided 'chapter by chapter', then the searcher module 206 first identifies a chapter where the target language sentence 516 is located at and counts a number of starting sentences from a beginning of the chapter to a location of the highlighted sentence. The pre-translated primary language sentence 514 may be displayed followed by the same number of the starting sentences 516. For another example, if a number of sentences in a chapter of the target language E-book is X (e.g., 50), a number of sentences in a chapter of the pre-translated primary language E-book is Y (e.g., 55), and a target language sentence to be mapped to a pre-translated primary language sentence is a Zth (e.g., $25^{th}$) sentence, then a sentence in a primary language E-book may be a Q=Y*Z/X (e.g., the $27^{th}$) sentence. In this manner, a substantially best estimated pre-translated primary language character group can be displayed on the display screen 102/120 encapsulated by the bubble 504.

The process 800 may then continue by displaying the pre-translated primary language sentence 514 presented on the bubble 504 (task 806) so that the user can visually determine a relative location of the pre-translated primary language sentence 514. However as explained above, the one-to-one mapping of the pre-translated primary language E-book and the target language E-book may not be available in the pre-translated primary language electronic resource. Therefore, the pre-translated primary language sentence 514 may lag or lead relative to the target language sentence 516. In this manner, the process 800 may then continue by the user determining whether the pre-translated primary language sentence 514 is ahead of the target language sentence 516, lags the target language sentence 516, or is correctly synchronized with the target language sentence 516 (inquiry task 808). Activating the scroll up 506 and/or scroll down 508 synchronization buttons as needed, the user can move a location of the pre-translated primary language sentence 514 in relation to the location of the target language sentence 516. The location of the pre-translated primary language sentence 514 in relation to the location of the target language sentence 516 may be lined-up to be synchronized. For example, if the pre-translated primary language sentence 514 is ahead of the target language sentence 516, the user can activate the scroll up synchronization button 506. In this manner, the synchronization module 204 receives an up button activation until synchronization is achieved (task 810). Similarly, if the pre-translated primary language sentence 514 lags the target language sentence 516, the user can activate the scroll down synchronization button 508. In this manner, the synchronization module 204 receives a down button activation until synchronization is achieved (task 812).

After finding a desired pre-translated primary language sentence, the user can choose to store the pre-translated primary language sentence for further reference or to erase the bubble 504 from the display screen 102/120 (inquiry task 814). The user can activate the confirm button 510 to store the pre-translated primary language sentence 514 and/or the target language sentence 516 (task 816) in the list 128/400/600, otherwise the user can activate the "OK" button 512 to erase the pre-translated primary language sentence 514 and/or the target language sentence 516 (task 818).

In this way, a system and a method are provided for reducing the workload of students studying in the target language.

In this document, the terms "computer program product", "computer-readable medium", and the like may be used generally to refer to media such as, for example, memory, storage devices, or storage unit. These and other forms of computer-readable media may be involved in storing one or more instructions for use by the processor module 208 to cause the E-book reader 100/200 to perform specified operations. Such instructions, generally referred to as "computer program code" or "program code" (which may be grouped in the form of computer programs or other groupings), when executed, enable the language mapping method of the E-book reader 100/200.

While at least one exemplary embodiment has been presented in the foregoing detailed description, the disclosure is not limited to the above-described embodiment or embodiments. Variations may be apparent to those skilled in the art. In carrying out the disclosure, various modifications, combinations, sub-combinations and alterations may occur in regard to the elements of the above-described embodiment insofar as they are within the technical scope of the disclosure or the equivalents thereof. The exemplary embodiment or exemplary embodiments are examples, and are not intended to limit the scope, applicability, or configuration of the disclosure in any way. Rather, the foregoing detailed description will provide those skilled in the art with a template for implementing the exemplary embodiment or exemplary embodiments. It should be understood that various changes can be made in the function and arrangement of elements without departing from the scope of the disclosure as set forth in the appended claims and the legal equivalents thereof. Furthermore, although embodiments of the disclosure have been described with reference to the accompanying drawings, it is to be noted that changes and modifications may be apparent to those skilled in the art. Such changes and modifications are to be understood as being comprised within the scope of the disclosure as defined by the claims.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 1-2 depict example arrangements of elements, additional intervening elements, devices, features, or components may be present in an embodiment of the disclosure.

Terms and phrases used in this document, and variations hereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items in the grouping be present, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

The invention claimed is:

1. A method for electronically accessing an a priori translated character group to provide an instant reading mechanism using a portable electronic system comprising at least one display screen, the method comprising:

instantly mapping a user selected target language character group on the at least one display screen in its entirety to a pre-translated primary language character group in response to a user selection of the user selected target language character group from a first region of target language on the at least one display screen;

displaying only one instance of the pre-translated primary language character group comprising only a primary language in a second region of the at least one display screen at only one display location separate from the first region and in proximity to the user selected target language character group in response to the user selection;

receiving a visual control by a user of movement of the pre-translated primary language character group in the second region by receiving activation of the at least one display screen based entirely on an input from the user;

receiving from the user a relative alignment coordination control of the pre-translated primary language character group to the user selected target language character group;

synchronizing interactively by the user on the at least one display screen the pre-translated primary language character group in the second region to the user selected target language character group in the first region to provide a synchronized pre-translated primary language character group; and displaying the synchronized pre-translated primary language character group and the user selected target language character group simultaneously on their respective separate regions of the at least one display screen.

2. The method according to claim 1, wherein the step of interactively synchronizing further comprises:

activating at least one synchronization button on the at least one display screen, wherein activating the at least one synchronization button moves the one display location of the pre-translated primary language character group only in relation and in proximity to the user selected location of the target language character group by the user interactively scrolling the at least one display screen; and activating a confirm button, if the location of the pre-translated primary language character group is synchronized to the location of the target language character group.

3. The method according to claim 1, further comprising displaying the pre-translated primary language character group in a bubble presented on the at least one display screen, wherein the bubble further comprises a phonetic pronunciation, or an example of usage of the pre-translated primary language character group.

4. The method according to claim 1, further comprising obtaining the pre-translated primary language character group from a pre-translated primary language electronic resource comprising a locally stored dictionary, a remotely accessible dictionary, a locally stored electronically translated book in the target language, a remotely accessible electronically translated book in the target language, or an interactive on-line internet translation service.

5. The method according to claim 1, further comprising storing data in a database organized according to a user preference.

6. The method according to claim 5, further comprising storing data comprising the pre-translated primary language character group, an example of a usage of the pre-translated primary language character group, a phonetic pronunciation, or the user selected target language character group.

7. The method according to claim 1, further comprising estimating an estimated location of the pre-translated primary language character group in a pre-translated primary language electronic resource based on calculation of at least one parameter corresponding to a location of the user selected target language character group in a target language electronic resource.

8. The method according to claim 7, further comprising searching the pre-translated primary language electronic resource to map the pre-translated primary language character group from the pre-translated primary language electronic resource corresponding to the location of the user selected target language character group in the target language electronic resource by estimating the estimated location, wherein the at least one parameter comprises: a chapter location, a section location, a position of a highlighted sentence, a number of starting sentences prior to highlighting a sentence, a previous synchronization position, a page number, or a combination thereof.

9. The method according to claim 1, further comprising activating the target language character group on the at least one display screen via the user selection comprising a touching, a pointing to, or a highlighting the at least one display screen.

10. The method according to claim 1, further comprising accessing a pre-translated primary language electronic resource in response to receiving the user selection to allocate a pre-translated primary language E-book comprising a pre-translated version of a target language E-book in a primary language to provide the pre-translated primary language character group.

11. The method according to claim 1, further comprising displaying the pre-translated primary language character group on a bubble presented on the at least one display screen.

12. A portable electronic system for electronic instant reading, the system comprising:
at least one display screen;
a searcher module operable to instantly map a user selected target language character group on the at least one display screen in its entirety to a pre-translated primary language character group in response to a user selection of the user selected target language character group from a first region of target language on the at least one display screen;
a synchronization module operable to:
receive a visual control by a user of movement of the pre-translated primary language character group in a second region of the at least one display screen by receiving activation of the at least one display screen based entirely on an input from the user;
receive from the user a relative alignment coordination control of the pre-translated primary language character group to the user selected target language character group; and
synchronize interactively by the user on the at least one display screen the pre-translated primary language character group in the second region to the user selected target language character group in a first region on the at least one display screen to provide a synchronized pre-translated primary language character group; and
the at least one display screen further operable to:
display only one instant of the pre-translated primary language character group comprising only a primary language in the second region of the at least one display screen only at one display location separate from the first region on the at least one display screen and in proximity of the user selected target language in response to the user selection, the first region and the second region bounded within the at least one display screen; and
simultaneously display on their respective separate regions of the at least one display screen the synchronized pre-translated primary language character group and the user selected target language character group.

13. The system according to claim 12, wherein activation of an OK button erases the pre-translated primary language group from the at least one display screen.

14. The system according to claim 12, wherein the portable electronic system is an E-book reader.

15. The system according to claim 12, further comprising:
at least one synchronization button operable to move the one display location of the pre-translated primary language character group only in relation and in proximity to the user selected location of the target language character group, upon interactive activation by the user; and
a confirm button operable to confirm synchronization, if the location of the pre-translated primary language character group is synchronized to the location of the target language character group.

16. The system according to claim 12, wherein the searcher module is further operable to estimate an estimated location of the pre-translated primary language character group in a pre-translated primary language E-book based on calculation of at least one parameter corresponding to the user selected location of the target language character group in a target language electronic resource.

17. The system according to claim 16, wherein the search module is further operable to search a pre-translated primary language E-book to map the pre-translated primary language character group from the pre-translated primary language E-book corresponding to the user selected target language character group in a target language E-book by estimating the estimated location, wherein the at least one parameter comprises: a chapter location, a section location, a position of a highlighted sentence, a number of starting sentences prior to highlighting a sentence, a previous synchronization position, a page number, or a combination thereof.

18. The system according to claim 12, wherein the pre-translated primary language character group and the user selected target language character group comprise at least a vocabulary word, at least a number, at least a symbol, at least an ideogram, or at least a logogram.

19. The system according to claim 12, wherein the pre-translated primary language character group is obtained from a pre-translated primary language electronic resource comprising a locally stored dictionary module, a remotely accessible dictionary module, a locally stored electronically translated book in the target language, a remotely accessible electronically translated book in the target language, or an interactive on-line internet translation service.

20. A non-transitory computer-readable medium comprising program code for accessing an a priori translated character group for instant reading an electronic resource using a portable electronic system comprising at least one display screen, the program code for:

instantly mapping a user selected target language character group on the at least one display screen in its entirety to a pre-translated primary language character group in response to a user selection of the user selected target language character group from a first region of target language on the at least one display screen;

displaying only one instance of the pre-translated primary language character group comprising only a primary language in a second region of the at least one display screen at only one display location separate from the first region and in proximity to the user selected target language character group in response to the user selection;

receiving a visual control by a user of movement of the pre-translated primary language character group in the second region by receiving activation of the at least one display screen based entirely on an input from the user;

receiving from the user a relative alignment coordination control of the pre-translated primary language character group to the user selected target language character group;

synchronizing interactively by the user on the at least one display screen the pre-translated primary language character group in the second region to the user selected target language character group in the first region to provide a synchronized pre-translated primary language character group; and displaying the synchronized pre-translated primary language character group and the user selected target language character group simultaneously on their respective separate regions of the at least one display screen.

\* \* \* \* \*